2,806,067

α-ETHYNYL-2,4,6-TRIMETHYL-3-CYCLOHEXENE-1-METHANOL

Roger F. Monroe and Fred J. Lowes, Midland, Mich., assignors to The Dow Chemical Company, Midland, Mich., a corporation of Delaware No Drawing. Application August 2, 1956, Serial No. 601,648

3 Claims. (Cl. 260—617)

This invention relates to the compound α-ethynyl-2,4,6-trimethyl-3-cyclohexene-1-methanol having the formula

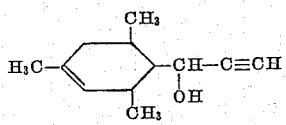

This compound is a viscos liquid somewhat soluble in many organic solvents and of very low solubility in water. It has been found to be active as a parasiticide and is adapted to be employed as an active toxic constituent of disinfectant compositions for the control of bacteria such as *Aspergillus terreus* and *Erwinia carotovora*. The compound is also useful as a corrosion inhibitor in acid solutions.

The new compound may be prepared by causing an alkali metal acetylide to react with 2,4,6-trimethyl-3-cyclohexene-1-carboxyaldehyde having the formula

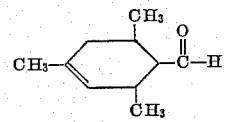

to produce an alkali metal salt of α-ethynyl-2,4,6-trimethyl-3-cyclohexene-1-methanol. The latter methylate product is thereafter hydrolyzed with a mineral acid to obtain the desired α-ethynyl-2,4,6-trimethyl-3-cyclohexene-1-methanol.

In the initial step of the present method, the reaction between the alkali metal acetylide and 2,4,6-trimethyl-3-cyclohexene-1-carboxyaldehyde is carried out in the presence of liquid ammonia. The reaction is exothermic and takes place readily at or below the temperature at which ammonia remains liquid at atmospheric pressure (−33° C.). Good results are obtained when employing substantially equimolecular proportions of the alkali metal acetylide and 2,4,6-trimethyl-3-cyclohexene-1-carboxyaldehyde. In a preferred method of operation, the reaction is carried out in the presence of acetylene. When operating in accordance with such preferred practice, optimum yields are obtained.

Upon completion of the reaction between the alkali metal acetylide and 2,4,6-trimethyl-3-cyclohexene-1-carboxyaldehyde, the ammonia is evaporated from the reaction mixture and the resulting product hydrolyzed with a mineral acid such as hydrochloric acid, phosphoric acid or sulfuric acid. The hydrolyzed product is thereafter washed with water and fractionally distilled under reduced pressure to separate the desired α-ethynyl-2,4,6-trimethyl-3-cyclohexene-1-methanol as a viscous liquid.

In carrying out the reaction, acetylene is bubbled through a solution of sodium or potassium amide in liquid ammonia to prepare a solution of the alkali metal acetylide in liquid ammonia. The 2,4,6-trimethyl-3-cyclohexene-1-carboxyaldehyde is added gradually proportionwise to the alkali metal acetylide solution at or below the temperature of liquid ammonia and preferably at a temperature of from −33° to −80° C. Where optimum yields are desired, the addition may be carried out while bubbling acetylene through the reaction zone. Following the addition of the carboxyaldehyde reactant, the reaction mixture is processed as previously described to obtain the desired product.

In a representative operation, 48 grams (2 moles) of sodium was dissolved in an excess of liquid ammonia to prepare a solution of sodium amide in liquid ammonia, and an excess of acetylene bubbled through this solution to produce a liquid ammonia solution of sodium acetylide. 2,4,6-trimethyl-3-cyclohexene-1-carboxyaldehyde (304 grams; 2 moles) was added gradually portionwise to the above liquid ammonia solution of sodium acetylide. The addition was carried out over a period of about two hours and at the boiling temperature of liquid ammonia at atmospheric pressure. During the addition, acetylene was slowly bubbled through the reaction zone. Following the addition, the ammonia solvent was removed by evaporation and the residue made slightly acid by the portionwise addition of dilute aqueous sulfuric acid with cooling. The acidified mixture was then successively washed with water and thereafter fractionally distilled under reduced pressure to separate an α-ethynyl-2,4,6-trimethyl-3-cyclohexene-1-methanol product as a viscous liquid boiling at 75° C. at one millimeter pressure and having a refractive index n/D of 1.4965 at 25° C.

The new compound of the present invention is effective as a parasiticide. For such use, the product may be dispersed on an inert finely divided solid and employed as a dust. Alternatively, it may be dispersed in water and employed as a spray. The new compound may likewise be employed as a constituent of oil-in-water emulsions with or without a wetting, dispersing or emulsifying agent. In representative operations, α-ethynyl-2,4,6-trimethyl-3-cyclohexene-1-methanol gives complete inhibition of the growth of *Staphylococcus aureus*, *Aspergillus terreus*, *Rhizopus nigricans*, *Erwinia carotovora* and *Penicillium digitatum* in agar culturing media saturated with the methanol compound.

The 2,4,6-trimethyl-3-cyclohexene-1-carboxyaldehyde employed as a starting material in accordance with the present invention is a commercially available product prepared by a Diels-Alder condensation of croton aldehyde and 2-methyl-1,3-pentadiene. It is a colorless liquid boiling at 76° C. at 10 millimeters pressure and having a refractive index n/D of 1.4675 at 25° C.

We claim:
1. α-Ethynyl-2,4,6-trimethyl-3-cyclohexene-1-methanol.
2. A process for the manufacture of α-ethynyl-2,4,6-trimethyl-3-cyclohexene-1-methanol which comprises the steps of (1) reacting an alkali metal acetylide with 2,4,6-trimethyl-3-cyclohexene-1-carboxyaldehyde in the presence of liquid ammonia to product the alkali metal salt of α-ethynyl-2,4,6-trimethyl-3-cyclohexene-1-methanol, and (2) hydrolyzing said salt with a mineral acid.
3. A process claimed in claim 2 wherein the reaction is carried out in the presence of acetylene.

References Cited in the file of this patent

UNITED STATES PATENTS

| | | |
|---|---|---|
| 2,163,720 | Vaughn | June 27, 1939 |
| 2,672,481 | Weisler et al. | Mar. 16, 1954 |
| 2,775,626 | Schaaf et al. | Dec. 25, 1956 |

OTHER REFERENCES

Golouchanskaya: Chem. Abstracts, vol. 35 (1941), col. 6931 (1 page).